Nov. 3, 1942.  C. E. HUNZIKER  2,300,924
FILTER
Filed May 17, 1939  3 Sheets-Sheet 1
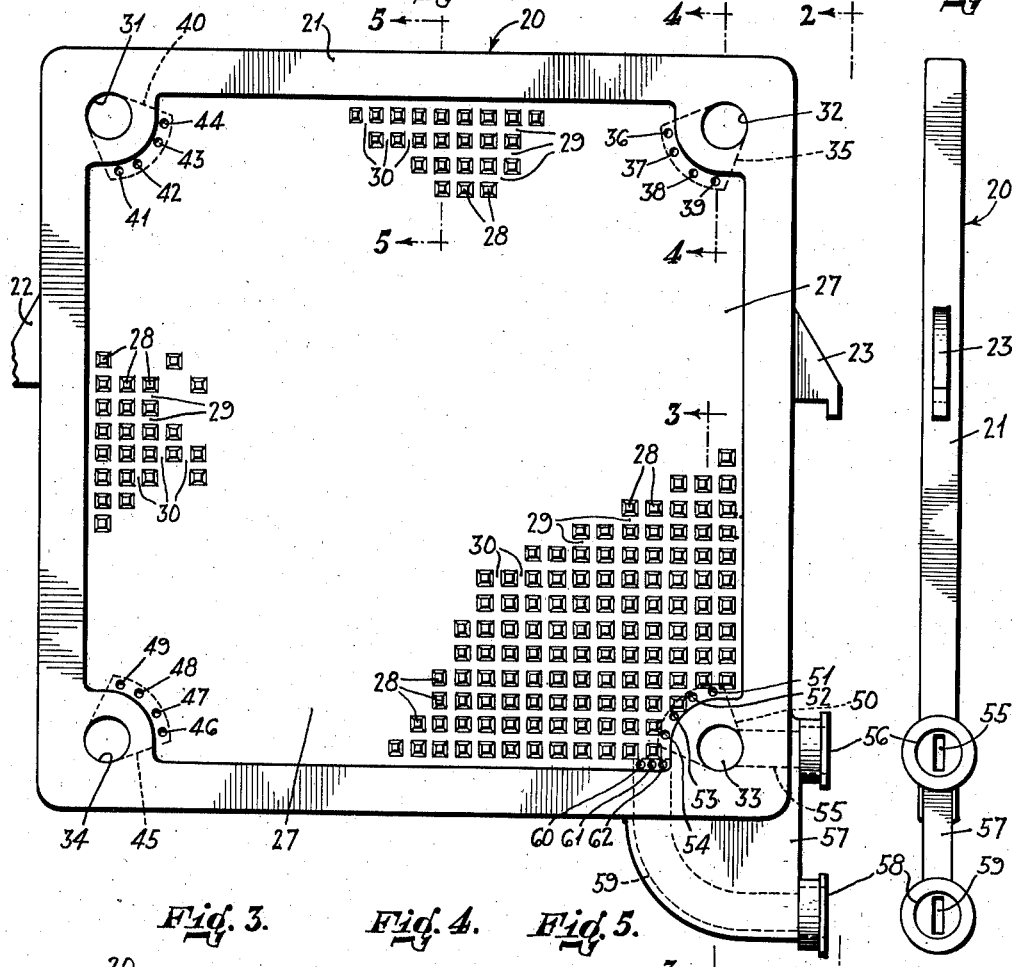
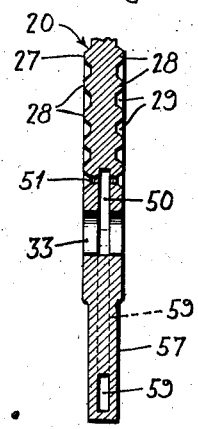
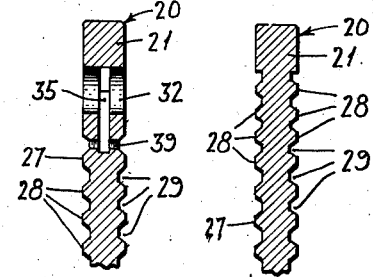
INVENTOR.
CHARLES E. HUNZIKER
BY
ATTORNEYS Nov. 3, 1942.     C. E. HUNZIKER     2,300,924
FILTER
Filed May 17, 1939     3 Sheets-Sheet 2
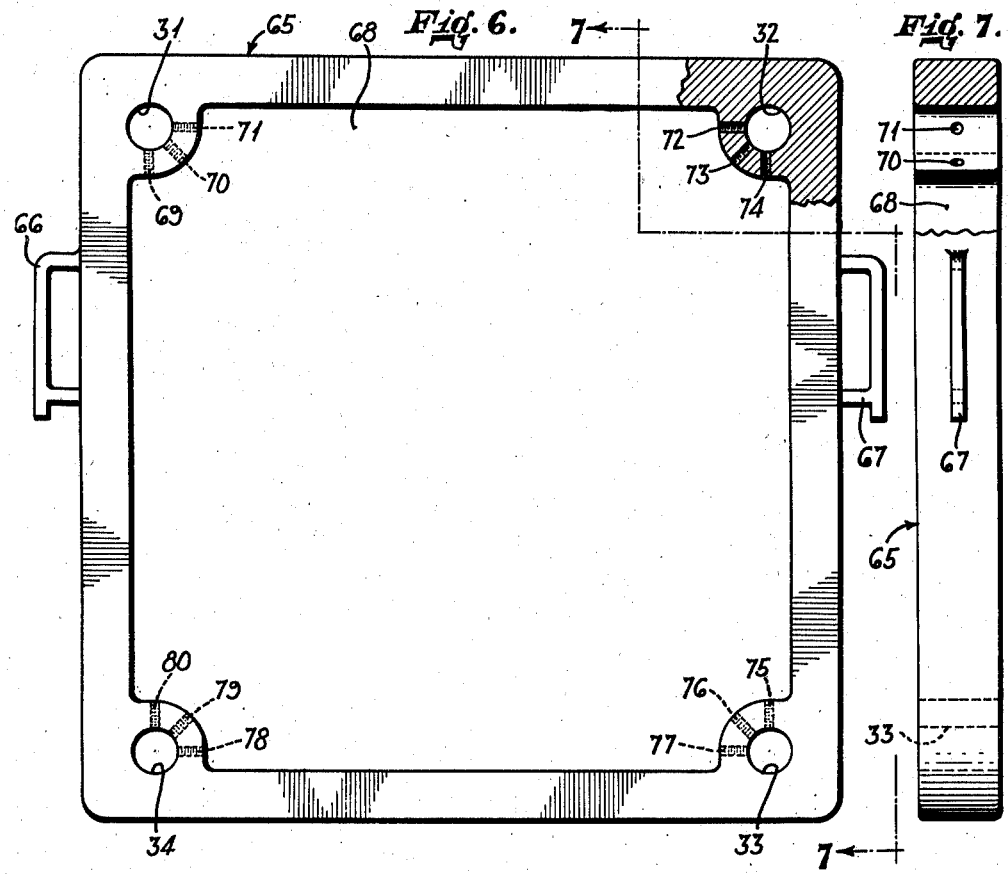
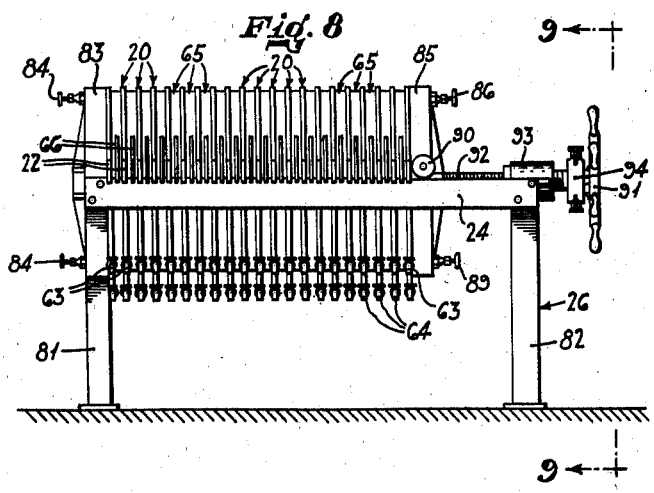
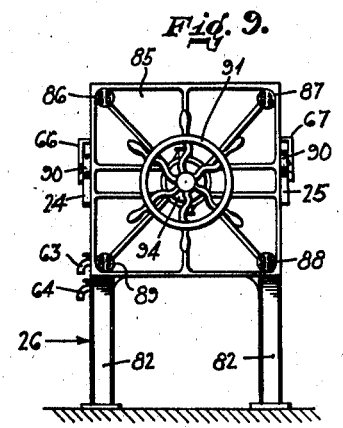
INVENTOR.
CHARLES E. HUNZIKER
BY
Richards & Geier
ATTORNEYS

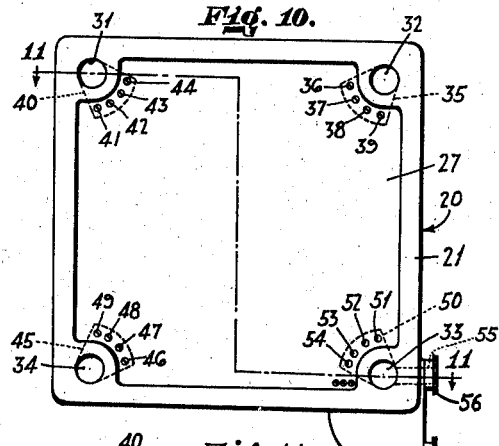

Patented Nov. 3, 1942

2,300,924

UNITED STATES PATENT OFFICE 2,300,924

FILTER

Charles E. Hunziker, Paterson, N. J.

Application May 17, 1939, Serial No. 274,119

9 Claims. (Cl. 210—195)

This invention relates to filters, and refers more particularly to a universal filter capable of being used for a variety of purposes.

Various filtering operations, such as clarification, recovery, i. e., separation of residues from the liquid, and simple or thorough washing, require different arrangements for the flow of the liquid, and heretofore it was considered necessary to use different filters consisting of differently constructed filter plates and filter frames for each of these operations.

An object of the present invention is the provision of a single filter which is so constructed that it can be conveniently and easily adapted to carry out different operations requiring different flows of liquid through the filter.

Another object of the present invention is the provision of a filter consisting of a number of filter plates and/or filter frames which are so constructed that the character and the mode of operation of the filter may be easily and conveniently changed by the user, so that the same filter can be adequately and effectively employed for the purpose of carrying out a variety of filtering operations, such as clarification, recovery and washing.

Other objects of the present invention will become apparent in the course of the following specification.

The objects of the present invention may be realized through the provision of a filter, each of the filter frames and/or filter plates of which is provided with passages or holes which are so disposed that a combination of some of these passages and holes may be satisfactorily used for carrying out any one of the required operations, suitable means being provided for closing those of the passages and holes which are not required for a particular operation.

Thus, in accordance with the present invention, there are provided universal filter plates and/or universal filter frames for the purpose of eliminating the necessity of using differently constructed filter frames and/or filter plates for different filtering operations.

The invention will appear more clearly from the following detailed description when taken in connection with the accompanying drawings showing by way of example a preferred embodiment of the inventive idea.

In the drawings:

Figure 1 is a front view of a filter plate constructed in accordance with the principles of the present invention;

Figure 2 shows the filter plate in side elevation, looking in the direction of arrows 2—2 of Figure 1;

Figure 3 is a partial cross-section along the lines 3—3 of Figure 1 on a larger scale;

Figure 4 is a partial cross-section along the lines 4—4 of Figure 1;

Figure 5 is a partial cross-section along the line 5—5 of Figure 1;

Figure 6 shows a hollow filter frame in front elevation with some parts broken off;

Figure 7 is partly a section and partly a side elevation along the lines 7—7 of Figure 6;

Figure 8 is a side elevational view showing a filter press which includes the filter plates and filter frames of Figures 1 to 7;

Figure 9 is an end elevation along the line 9—9 of Figure 8;

Figure 10 is a diagrammatic front view of a filter plate illustrating the operation of the plate in the course of a recovery operation;

Figure 11 is a section through some of the plates and frames constituting a filter press, along the lines 11—11 of Figure 10; it illustrates the flow of the liquid in the course of a recovery operation;

Figure 12 is similar to Figure 10 and illustrates a filter plate in the course of a washing operation;

Figure 13 is a section through filter plates and frames along the lines 13—13 of Figure 12 and illustrates the flow of the liquid in the course of the washing operation;

Figure 14 is similar to Figures 10 and 12 and illustrates a filter plate in the course of a clarification operation;

Figure 15 is a section through filter plates and frames along the lines 15—15 of Figure 14 and illustrates the flow of the liquid in the course of the clarification operation;

Figure 16 is similar to Figures 10, 12, and 14 and illustrates a filter plate in the course of a thorough washing; and Figure 17 is a section through filter plates and frames along the lines 17—17 of Figure 16 and illustrates the flow of the liquid in the course of the thorough washing.

The filter plate 20 shown in the drawings comprises an outer substantially rectangular frame portion 21 and handles 22 and 23 situated on opposite sides of the frame portion 21, and, preferably, integral therewith.

The handles 22 and 23 may be of any suitable form and are used for maintaining the plates 20 upon the handle supports 24 and 25 constituting a part of the filter frame 26, which is shown in Figures 8 and 9.

As shown in Figures 1, 3, 4, and 5, the central portion 27 of each filter plate 20 includes a plurality of pyramidal projections or bosses 28, which are separated from each other preferably by horizontal channels 29 and vertical channels 30.

Obviously, the channels 29 and 30 may extend in any suitable direction.

Each of the plates 20 comprises four ports or passages 31, 32, 33 and 34 situated at the four corner portions of the plate.

As shown more clearly in Figures 1 and 4, the port 32 extending transversely through the plate 20 is in communication with the substantially flat and narrow opening or passage 35 which is drilled into the plate 20 and which communicates with the central portion 27 of the plate by the tapped or threaded holes 36, 37, 38 and 39. As shown in Figure 4, the flat opening 35 extends in the direction of the plate 20 while the port 32 and the tapped holes 36 to 39 extend transversely across the plate 20.

The port 31 is in communication with a similar flat opening 40 which communicates with the central portion 27 of the plate 20 by means of the tapped holes 41, 42, 43, and 44.

The port 34 communicates with a similar flat opening 45 which is in communication with the central portion 27 of the plate 20 by the tapped holes 46, 47, 48 and 49.

As shown in Figures 1 and 3, the port 33 is in communication with a flat opening 50, which is in communication with the central portion 27 of the plate 20 by means of the tapped holes 51, 52, 53, and 54. The port 33 is also in communication with a flat opening or hole 55 (Figures 1 and 2) which extends across the frame portion 21 of the plate 20 and is enclosed by an open delivery vent 56.

That portion of the filter plate 20 which is situated closely to the port 33 is provided with a downwardly extending extension piece 57 which carries the delivery vent 56 as well as another open delivery vent 58 situated underneath the delivery vent 56. A substantially flat passage 59 extends through the extension piece 57 and is in communication with the tapped holes 60, 61, and 62 which are provided in the central portion 27 of the plate 20 substantially closely to the tapped holes 51 and 54.

As indicated in Figures 8 and 9, each of the delivery vents 56 carries a pet cock 63, while each of the delivery vents 58 carries a pet cock 64.

The cocks 63 are normally closed and the passages or vents 56 are used for the so-called visible closed discharge by taking the liquid from these passages back into the passages or vents 55 by means of a pipe connection and sight glasses.

The filter press also comprises a number of hollow, substantialy rectangular filter frames 65, shown in Figures 6 and 7. The frames 65 are provided with handles 66 and 67, which maintain the frames upon the supports 24 and 25 (Figures 8 and 9).

Each of the frames 65 is provided with four ports, which are in alignment with the ports 31 to 34 of the plates 20 and which, for simplicity's sake, are designated by the same numerals in the drawings. The port 31 of a frame 65 is in communication with the hollow interior 68 of the frame by three tapped holes 69, 70 and 71. The port 32 is in communication with similar tapped holes 72, 73 and 74. The port 33 is in communication with similar tapped holes 75, 76 and 77, while the port 34 is in communication with the tapped holes 78, 79 and 80.

The general assembly of the filter press consisting of filter plates 20, filter frames 65 and interposed filter cloths 95 (Figures 11, 13, 15 and 17), is illustrated in Figures 8 and 9 of the drawings. The plates 20 and the frames 65 are carried by supports 24 and 25, which are carried by the columns or legs 81 and 82 of the frame 26. The columns 81 also carry an end head 83 provided with four valves 84, two of which are shown in Figure 8, and each of which communicates with a separate one of the ports 31 to 34.

The filter press is also provided with a movable head 85 carrying four valves 86, 87, 88, and 89, shown in Figure 9. The valve 86 communicates with the port 31; the valve 87 communicates with the port 32; the valve 88 communicates with the port 33; while the valve 89 is in communication with the port 34.

The movable head 85 is carried by rollers 90 upon the supports 24 and 25 and is moved toward and away from the end head 83 by a hand wheel 91 connected with a threaded rod 92 supported in a sleeve 93. The hand wheel 91 is also connected with a substantially round member 94 which is adapted to receive the end of a crowbar or a lever used to increase the pressure of the head 85.

The described plates 20 and the frames 65 of the filter press are used in conjunction with any suitable plugs or set screws, which may be screwed into any one of the described tapped holes for the purpose of closing these holes and thus diverting the flow of the liquid.

Various modes of operating the filter are described hereinafter. A filter is permanently set for each operation and in order to adapt it for another operation, it is necessary to withdraw the plates and frames and open or plug in the various holes by hand.

Figures 10 and 11 are diagrams illustrating the use and the operation of the filter plates 20 and filter frames 65 when the filter press is used for recovery, namely, for separating a residue from a liquid. The liquid may be introduced through one of the valves 84 (Figure 8) into the port or passage 31. As indicated in Figures 10 and 11, the tapped holes 41 to 44 of the plates 20, communicating with the port 31 are plugged in or closed, while the tapped holes 69, 70 and 71 of the filter frames 65 are open, so that the liquid can flow into the interior of the hollow frames 65. In the course of this flow, the liquid will pass through the filter cloths 95 which are situated between each of the plates 20 and the adjacent frame 65.

The residue 96 is deposited upon the filter cloths 95. The tapped holes 75, 76, and 77 of the frames 65, communicating with the port 33 are closed, while the tapped holes 51 to 54 of the plates 20, which communicate with the same port 33 are open (Figure 10), so that the liquid will flow again through the filter cloths 95 and through the tapped holes 51 to 54 into the port or passage 33. The liquid may be removed through the openings 55 communicating by the vents 56 with the valves 63, shown in Figures 8 and 9.

When the press filter is to be used for clarification, the liquid may be caused to flow from the port or passage 34 into the port or passage 32. This operation is not illustrated in the drawings. In the course of this operation the tapped holes 78, 79 and 80 of the filter frames 65 and the tapped holes 36, 37 and 38 of the filter plates 20 are open, while all the other tapped holes are closed.

The liquid is then introduced through the corresponding valve 84 and flows through the passage or port 34. Since the tapped holes 46 to 49 of the filter plates 20 are closed, the liquid will not be able to pass therethrough. However, since the tapped holes 78, 79 and 80 of the frames 65 are open, the liquid will pass into the interior of the hollow frames 65 and will fill this space. It will pass through the open tapped holes 36, 37, 38 and 39 of these plates into the port or passage 32, being removed from the filter press through the valve 86 (Figures 8 and 9).

The simple washing may be carried out in the same direction as that of the filtration flow.

Figures 12 and 13 illustrate a preferred mode of regulating the flow of the liquid when a thorough washing of a filter cake is required. After the filtration process has been carried out by the flow of the liquid from the passage or port 34 to the passage or port 32, the thorough washing is carried out by introducing the liquid into the passage or port 31. At that time the tapped holes 41 to 44 of some of the filter plates 20 are open. As shown in Figure 13, the arrangement is such that a filter plate 20 having open tapped holes 41 to 44 is followed by a filter plate the tapped holes 41 to 44 of which are closed, while the tapped holes 41 to 44 of the next filter plate are again open. All the tapped holes of the filter frames 65 situated between the filter plates 20 are closed.

Filter plates 20 having open tapped holes 41 to 44 have no other open holes, while the intermediate filter plates 20 the tapped holes 41 to 44 of which are closed, have open tapped holes 51 to 54, while all other tapped holes of these plates are closed.

As shown in Figure 13, the liquid flowing through the port 31 will then flow through the open tapped holes 41 to 44 and passing through the filter cloths 95 will be introduced into the interiors of the frames 65, which are filled with filter cakes 97. The liquid will flow through these cakes and will pass through other filter cloths 95 into the opened tapped holes 51 to 54 and will flow through the passages 58 into the passage or port 33, being removed therefrom through the openings 55, the delivery vent 56 and the valves 63.

Figures 14 and 15 illustrate the use of the filter press for clarification, recovery, filtration or simple washing, wherein the liquid is introduced into the passage 31 through the corresponding valve 84. The tapped holes 41 to 44 of the plates 20 which normally communicate with the passage 31 are closed, while the tapped holes 69, 70, and 71 provided in the frames 65 are open, so that the liquid will flow through the last-named holes into the interior of the frames 65 depositing the filtrate residue 96 upon the side surfaces of the filter cloths 95.

All the other tapped holes of the filter frames 65 are closed, while only the tapped holes 60, 61 and 62 of the filter plates 20 are open. Therefore, the liquid will flow through the filter cloths 95 and into the tapped holes 60, 61 and 62 and the passage 59 being removed from the filter press through the delivery vent 58 and the cocks 64 (Figures 8 and 9).

Figures 16 and 17 show the use of the filter press for a thorough washing, wherein open flow delivery is utilized. The liquid is introduced through the corresponding valve 84 into the passage 31. As shown in the diagram of Figure 17, every second filter plate 20 is provided with open tapped holes 41 to 44, while the tapped holes 41 to 44 of every intermediate plate 20 are closed. The liquid is therefore caused to flow through the open tapped holes 41 to 44 and through the filter cloths 95 into the interior of the filter plates 65 which are filled with filter cakes 97.

Those filter plates 20 the tapped holes 41 to 44 of which are closed, are provided with open tapped holes 60, 61 and 62, while all the tapped holes of the filter frames 65 are closed. The liquid will therefore flow through the filter cloths 95 into the open tapped holes 60, 61 and 62 and is removed from the press through the passages 59, the delivery vents 58 and the cocks 64.

Obviously, the described operations have been shown by way of example and many other methods of flow may be used in connection with the described filter.

Furthermore, the structures above described are subject to wide variation and modification without departing from the scope or intent of the invention, all of which variations and modifications are to be included within the scope of the present invention.

What is claimed is:

1. A filter press, comprising, in combination, a filter plate and a filter frame adjacent to the filter plate, said filter plate having formed therein a plurality of transverse ports, separate passages communicating with said ports, and transverse holes communicating with said passages; said filter frame having formed therein a plurality of transverse ports which are in alinement with the ports of the filter frame and constitute continuations thereof, and holes communicating with said ports; at least some of said holes being adapted to be closed to vary the flow of the liquid through said plate and frame.

2. In a filter press, a substantially rectangular filter plate having formed therein a transverse port in each of the corners thereof, separate passages communicating with said ports, and transverse holes communicating with said passages and adapted to be closed to vary the flow of a liquid through the press.

3. In a filter press, a substantially rectangular filter plate having a frame portion and a central portion; and a plurality of projections carried by said central portion; said filter plate having formed therein a part in each of the corners thereof extending transversely through the frame portion of the plate, separate passages extending in the direction of the plate and communicating with said ports, and holes formed in the central portion of said plate and extending transversely thereto, said holes communicating with said passages and being adapted to be closed to vary the flow of a liquid through the press.

4. In a filter press, a filter plate having a frame portion and a central portion; and a plurality of projections carried by said central portion, grooves being formed between said projections; said filter plate having formed therein four ports extending transversely through the frame portion of the plate, two of these ports being situated diametrically opposite each other, separate passages extending in the direction of the plate and communicating with said ports, and holes formed in the central portion of said plate and extending transversely thereto, said holes communicating with said passages and being adapted to be closed to vary the flow of a liquid through the press, at least one of said ports being situated close to the bottom of the plate.

5. In a filter press, a substantially rectangular filter plate having a frame portion and a central portion; and a plurality of projections carried by said central portion; said filter plate having formed therein a port in each of the corners thereof extending transversely through the frame portion of the plate, separate passages extending in the direction of the plate and communicating with said ports, another passage formed in the frame portion of said plate and extending from an edge thereof to one of said ports, and holes formed in the central portion of said plate and extending transversely thereto, said holes communicating with the first-mentioned passages and being adapted to be closed to vary the flow of a liquid through the press.

6. In a filter press, a filter plate comprising a frame portion having a plurality of transverse ports formed therein, a central portion having a plurality of projections, and an extension portion situated adjacent one of said ports and having two separate delivery vents, said filter plate having separate passages formed therein which extend in the direction of the plate and communicate with said ports, another passage formed in the plate and extending from one of said delivery vents to the adjacent port, still another passage formed in said plate and extending from the other one of said delivery vents to the central portion of the plate, and holes formed in the central portion of said plate and extending transversely thereto, said holes communicating with the first-mentioned passages and the last-mentioned passage and being adapted to be closed to vary the flow of a liquid through the press.

7. In a filter press, a substantially rectangular filter plate comprising a frame portion having four transverse ports formed therein and situated adjacent the corners of the plate, a central portion having a plurality of projections, grooves being formed between said projections, an extension portion situated adjacent one of the corners of the plate and having two separate delivery vents, and lateral supports situated on opposite sides of said plate for supporting said plate within the filter press, said filter plate having separate passages formed therein which extend in the direction of the plate and communicate with said ports, another passage formed in the plate and extending from one of said delivery vents to the adjacent port, still another passage formed in said plate and extending from the other one of said delivery vents to the central portion of the plate, and holes formed in the central portion of said plate and extending transversely thereto, said holes communicating with the first-mentioned passages and the last-mentioned passage and being adapted to be closed to vary the flow of a liquid through the press.

8. A filter press, comprising, in combination, a plurality of filter plates and filter frames having hollow interiors and interposed between said filter plates, said filter plates and said filter frames having transverse intercommunicating ports formed therein constituting a plurality of separate passages extending through the press, holes formed in said filter frames and communicating with said ports and the interiors of said frames, other passages formed in said filter plates and communicating with said ports, and holes formed in said filter plates and communicating with the second-mentioned passages, the holes of the press being adapted to be closed in various combinations to vary the flow of a liquid through the press.

9. A filter press, comprising, in combination, a plurality of filter plates and filter frames having hollow interiors and interposed between said filter plates, each of said filter plates and filter frames having four transverse ports formed therein, each of said ports being in alignment with the corresponding ports of the other filter plates and filter frames when said plates and frames are placed one next to the other to form four separate passages extending through the press, holes formed in said filter frames and communicating with said ports and the interiors of said frames, other passages formed in said filter plates and communicating with said ports; each of said filter plates having a separate extension portion situated adjacent one of said ports and having two separate delivery vents, a passage formed in said extension portion and extending from one of said delivery vents to the adjacent port, another passage formed in said extension portion and extending from the other one of said delivery vents into the plate, and holes formed in said filter plates and communicating with the second-mentioned passages and the last-mentioned passage, the holes of the press being adapted to be closed in various combinations to vary the flow of a liquid through the press, cocks carried by said delivery vents, means supporting said filter plates and filter frames, and means pressing said filter plates and filter frames against each other, the last-mentioned means including means for introducing a liquid into any one of the first-mentioned passages and for removing it therefrom.

CHAS. E. HUNZIKER.